United States Patent [19]

Thomas

[11] 4,301,655
[45] Nov. 24, 1981

[54] COMBINATION INTERNAL COMBUSTION AND STEAM ENGINE

[76] Inventor: Luther B. Thomas, 159 Herndon Ave., Shreveport, La. 71101

[21] Appl. No.: 103,738

[22] Filed: Dec. 14, 1979

[51] Int. Cl.³ .............................................. F02B 29/06
[52] U.S. Cl. .................................................... 60/712
[58] Field of Search ................ 60/618, 712; 123/25 C, 123/25 P

[56] References Cited

U.S. PATENT DOCUMENTS

| | | | |
|---|---|---|---|
| 1,339,176 | 5/1920 | Dyer | 60/712 |
| 1,727,860 | 9/1929 | Carlson | 123/25 P |
| 2,671,311 | 3/1954 | Rohrbach | 123/25 C |
| 3,964,263 | 6/1976 | Tibbs | 60/618 |

FOREIGN PATENT DOCUMENTS 52-4178  3/1977  Japan .................................. 123/25 P

*Primary Examiner*—Allen M. Ostrager
*Attorney, Agent, or Firm*—D. Paul Weaver

[57] ABSTRACT

An improved cylinder head for a fuel injected internal combustion piston engine is channeled so as to form a miniature steam boiler at the combustion end of the cylinder bore enabling injected water to flash into superheated steam in a few milliseconds. The cylinder head is configured to provide the maximum heat transfer surface area thereon. The generated steam in the engine supplements its power, and assists in controlling engine temperature.

7 Claims, 7 Drawing Figures

U.S. Patent  Nov. 24, 1981  Sheet 1 of 2  4,301,655

COMBINATION INTERNAL COMBUSTION AND STEAM ENGINE

BACKGROUND OF THE INVENTION

The invention is an improvement on that type of combination internal combustion and steam engine shown in U.S. Pat. No. 3,959,974. More particularly, the present invention is embodied in an improved cylinder head for a combination piston internal combustion and steam engine, the head being structured to form thereon a miniature steam boiler which can utilize the elevated pressures and temperatures of combustion to almost instantly generate superheated dry steam which supplements the power of the engine.

In one embodiment, the cylinder head possesses multiple internal radiating water injection ports leading to open grooves or serrations in the surface of the head defining the top of the combustion chamber. In a second embodiment, a water injector in the head of the engine delivers water through multiple radiating ports to radial channels of an attachment plate on the underside of the cylinder head. In either embodiment, superheated steam to boost engine power is generated within ten milliseconds.

The invention is characterized by extreme simplicity, economy of manufacturing and high efficiency of operation. Its many advantages over the known prior art will be apparent during the course of the following description.

DETAILED DESCRIPTION

Figure 1:
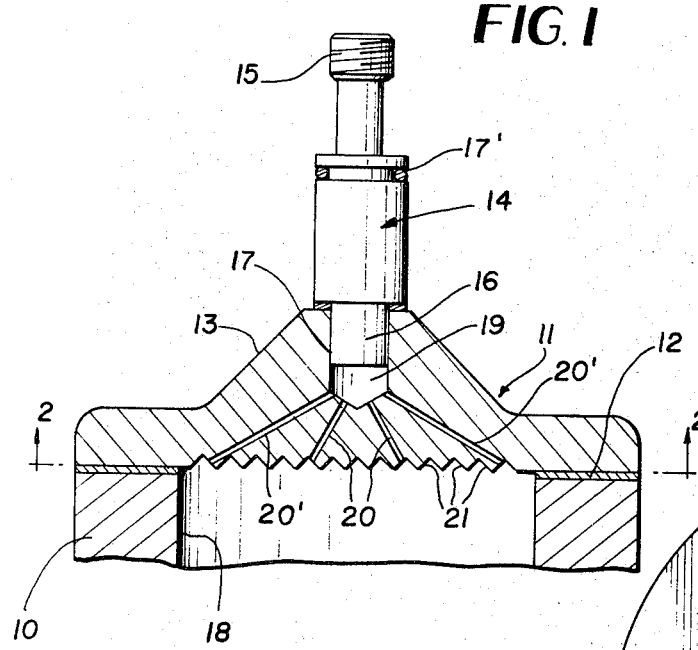
FIG. 1 is a fragmentary central vertical section through one cylinder and cylinder head of a combination internal combustion and steam engine according to this invention.
Figure 2:
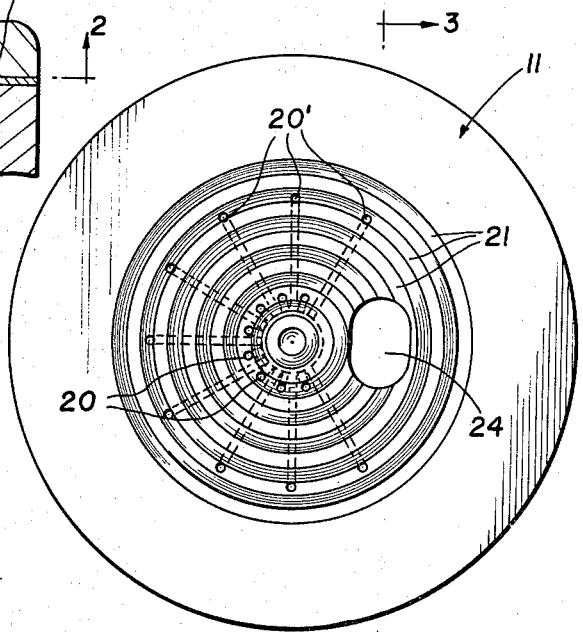
FIG. 2 is a transverse horizontal section taken on line 2—2 of FIG. 1 viewing the grooved face of the cylinder head.
Figure 3:
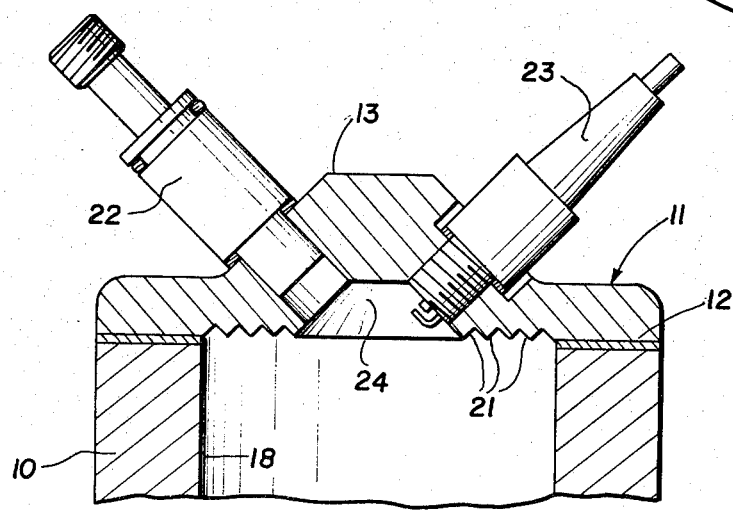
FIG. 3 is a fragmentary vertical section taken on line 3—3 of FIG. 2 and showing a fuel injector and spark plug in the cylinder head.

Referring to the drawings in detail wherein like numerals designate like parts, in FIGS. 1 through 3, the numeral 10 designates one cylinder of a combination internal combustion and steam engine containing a suitable piston, not shown. A cylinder head 11 forming the main subject matter of the invention is suitably secured to the top face of the cylinder block, and an appropriate head gasket 12 is provided. The head 11 has a central crowned portion 13 at the top of which is mounted a water injector 14 receiving water through a fitting 15 from a conventional source, not shown. The injector 14 has a nipple 16 held in a central opening 17 of head 11 by a conventional clamping means 17'. When the engine reaches full operating temperature, prior to which the engine is running on fuel only, the injector 14 delivers water under proper pressure to a chamber 19 of head 11 in communication with a plurality of circumferentially spaced radiating small delivery ports 20 and 20' which deliver high temperature water to the bottom face of the cylinder head 11.

As shown in FIG. 2, the shorter length water ports 20 have their outlets on a smaller arc close to the center of the cylinder and this array of ports 20 extends for more than 180 degrees circumferentially for maximum distribution of injected water over the area spanned by the cylinder head. The longer ports 20' similarly have their outlets arranged on a larger arc around the center of the cylinder which also spans more than 180 degrees. Thus, water injected from the outlets of ports 20 and 20' is distributed over substantially the entire lower face of the head 11 which holds sufficient heat to cause the water to flash substantially instantly into superheated steam. This steam supplements the power of the combustion engine and the formation of steam takes heat from the head 11 and in so doing controls the temperature of the engine.

Figure 7:
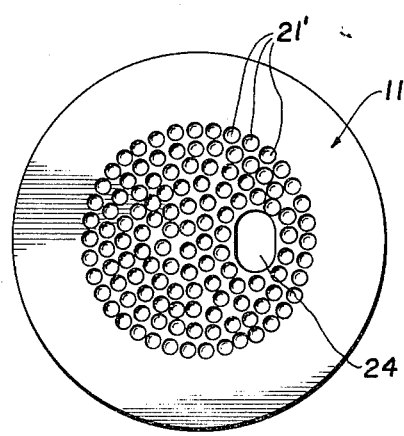
FIG. 7 is a view similar to FIG. 2 showing a modification.

A further feature of the invention resides in increasing the effective surface area of the bottom of the head 11 at the cylinder bore 18 so that more heat can be absorbed and held by the head for instant delivery to the injected water coming from the ports 20 and 20'. As shown in FIG. 2, this surface area can be increased by providing a multiplicity of concentric grooves 21 in the bottom face of head 11 across the cylinder bore 18. In some cases, straight grooving in one or two directions can be utilized. Another possibility for greatly expanding surface area is shown in FIG. 7 wherein a multiplicity of small conical recesses 21' are produced in the lower face of head 11 by use of a drill bit. The recesses 21' are closely packed to produce the maximum possible heat absorbing surface area on the cylinder head.

Whether grooved or recessed, the heat of combustion absorbed and held by the head 11 is utilized to produce superheated steam in approximately ten milliseconds when the injected water from ports 20 and 20' reaches the lower surface of the head facing the combustion chamber. The two main features of the present invention and the objectives thereof are to transfer as much heat as possible from the combustion chamber to the head 11 to allow the generation of superheated steam very quickly, and then in the generation of this steam during the operation of the engine to cyclically remove heat from the head 11 and in so doing cool the head and control the temperature of the engine.

The injected water in the engine has been entirely converted to superheated steam by the time it exits from the ports 20 and 20' on the hot bottom face of the head 11 and only steam, as distinguished from water, enters the combustion space to supplement the power of the engine developed by the explosion of fuel in the combustion space.

As shown in FIG. 3, the cylinder head 11 in its crowned portion 13 also serves to mount a fuel injection device 22 and a coacting spark plug 23. The axes of these elements converge into a lower chamber 24 of the head 11 located radially outwardly from the axis of water injector 14, as shown in FIG. 2. The valving and exhaust system for the engine may be conventional and forms no part of this invention and has been omitted in the drawings for simplicity and because the invention has been embodied primarily in the cylinder head 11.

During engine operation and when the engine is first started up and before reaching full operating temperature, it is running on fuel only without water injection. When optimum engine operating temperature is reached, the cycling of fuel and water injections will start. The amount of water injected is very small, only a few drops per cycle. The preheated water is injected at a pressure of about 2000 psi into the head chamber 19 which, in effect, is a chamber in a miniature boiler. The injected water is divided through the many small ports 20 and 20′ and becomes superheated steam virtually instantly as it exits the ports 20 and 20′ adjacent the bottom face of the head, as previously described. During each cylinder explosion, a great amount of heat is transferred to the head 11 through the expanded surface produced by grooving or recessing, as described. This heat is utilized for quickly converting injected water into steam as it passes through the small ports 20 and 20′. The entry of pressurized superheated steam into the combustion space boosts the power of the engine by augmenting the power caused by the combustion of fuel.

In the prior art, the necessary high temperatures for generating superheated steam have not been realized, and therein lies the advantage of the present invention over the prior art as a result of the unique construction of the cylinder head to realize the necessary high temperature.

Figure 6:
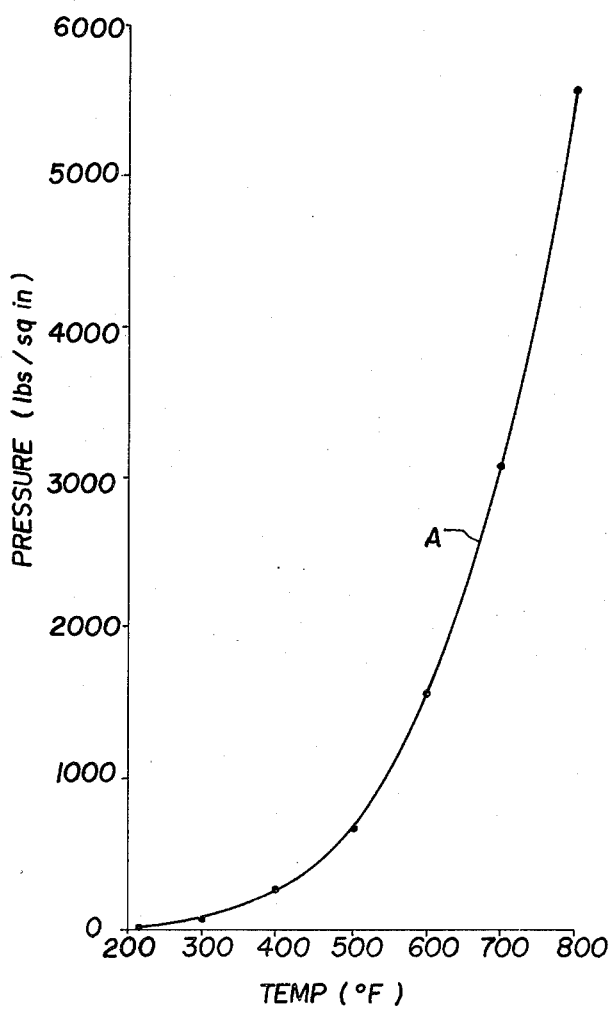
FIG. 6 is a graph of engine operating pressures and temperatures.

FIG. 6 shows a curve A plotted from temperature in degrees F. and pressure in psi. It can be seen from this curve or graph that saturated steam at 600° F. will have a pressure of 1574 psi, at 700° F. will have a pressure of 3075 psi, and at 800° F. will have a pressure of 5400 psi. Thus, the efficiency of the steam cycle depends on high temperatures and their effective utilization and the efficiency increases rapidly with increasing temperature and decreases rapidly if the temperature drops. The cylinder head structured according to the invention simply allows maximum and efficient utilization of the heat of combustion to create a practical and effective steam cycle in the combination engine which has not heretofore been accomplished in an engine of this type.

Since the disclosed engine is fuel injected, only air will be compressed by the piston prior to the injection of fuel and the heat of this compressed air will also be picked up by the surfaces of the grooves 21 to further assist in the instant formation of steam when water is injected and the production of greater power in the engine from a given amount of fuel.

Figure 4:
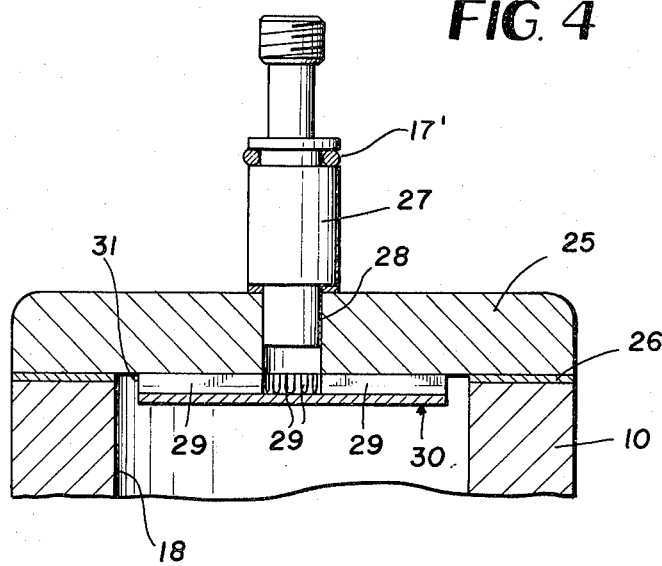
FIG. 4 is a view similar to FIG. 1 showing a second embodiment of the invention.
Figure 5:
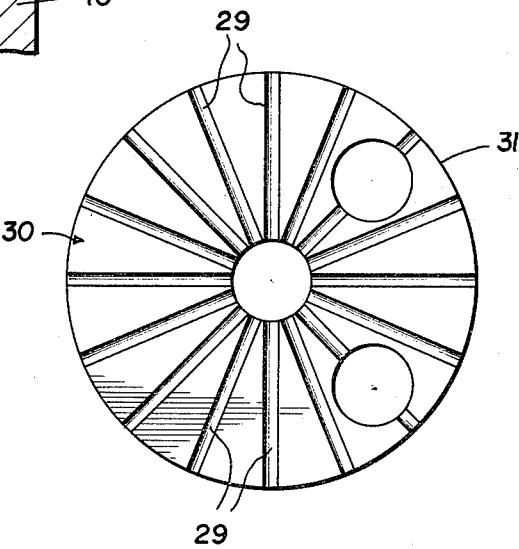
FIG. 5 is an enlarged plan view of a water distributor plate used in the second embodiment.

FIGS. 4 and 5 show a second embodiment of the invention in which engine cylinder 10 is equipped with a cylinder head 25 having a head gasket 26. A central axial water injector 27 similar to the injector 14 delivers water from its outlet fitting 28 to the interior ends of multiple radial grooves or channels 29 which are circumferentially spaced equidistantly, FIG. 5. These distribution grooves or channels 29 are formed in the top face of a plate 30 which is suitably fixed rigidly to the bottom of cylinder head 25, as by welding or other appropriate means. The peripheral edge 31 of channeled water distribution plate 30 is spaced radially from the cylinder bore 18, as shown in FIG. 4.

When water is injected by the device 27 in FIG. 4 during engine operation after the optimum temperature has been reached, the small amount of water will be flashed into superheated steam by the time it reaches the outer ends of the channels 29, as described in the prior embodiment. The plate 30 will pick up the necessary heat from engine combustion and will give up this heat in producing superheated steam to augment engine power, as previously described.

It is to be understood that the forms of the invention herewith shown and described are to be taken as preferred examples of the same, and that various changes in the shape, size and arrangement of parts may be resorted to, without departing from the spirit of the invention or scope of the subjoined claims.

I claim:

1. In a combination internal combustion and steam engine of the fuel injected type, a cylinder head, a water injection means connected with the cylinder head to deliver small amounts of water thereto cyclically during engine operation while the engine is at optimum operating temperature, the cylinder head being provided with multiple spaced small water distribution ports opening through the bottom face of the cylinder head adjacent to the cylinder combustion space for delivering superheated steam directly into the combustion space to augment engine power, and the bottom face of the cylinder head having effective area increasing recess means enabling the cylinder head to receive and store the heat necessary for quickly generating superheated steam from the injected water in said ports.

2. In a combination internal combustion and steam engine as defined in claim 1, said ports comprising internal circumferentially spaced radiating ports in the cylinder head having their outlets distributed over a wide area portion of said bottom face of the cylinder head which faces said combustion space.

3. In a combination internal combustion and steam engine as defined in claim 1, and said recess means being in the form of grooving in said bottom face to increase its effective area and its heat holding capacity necessary to generate superheated steam substantially instantly.

4. In a combination internal combustion and steam engine as defined in claim 1, and said recess means comprising a multiplicity of small closely packed recesses in said bottom face to increase its effective area and heat holding capacity necessary to generate superheated steam in a few milliseconds.

5. In a combination internal combustion and steam engine as defined in claim 1, and wherein the heat taken from the cylinder head to generate said steam controls the temperature of the cylinder head and also controls engine temperature.

6. In a combination internal combustion and steam engine of the fuel-injected type, a cylinder head, a water injection means connected with the cylinder head, multiple spaced water distribution channels leading from the cylinder head for producing steam from injected water in said channels by the utilization of the heat of combustion to increase the energy output of the engine, and the inside face of the cylinder head opposite to the cylinder combustion space having recess means to increase its effective area for correspondingly increasing its heat holding capacity.

7. In a combination internal combustion and steam engine, a cylinder head, a water injection means connected with the cylinder head, and the cylinder head being provided with multiple channels leading from the water injection means and radiating therefrom and including parts which are disposed in a common plane normal to the cylinder axis and parallel to the plane of the cylinder head.

* * * * *